（12） United States Patent
Lundquist et al.

(10) Patent No.: US 6,288,873 B1
(45) Date of Patent: Sep. 11, 2001

(54) CURVATURE ADJUSTMENT OF SLIDERS BY SCRIBING OF SLIDER SUSPENSION

(75) Inventors: Paul Matthew Lundquist, Bloomington, MN (US); Andrew Ching Tam, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/420,054

(22) Filed: Oct. 18, 1999

(51) Int. Cl.[7] ....................................................... G11B 5/60
(52) U.S. Cl. ...................................... 360/234.6; 360/245.4
(58) Field of Search ................................. 36/245.4, 234.6

(56) References Cited

U.S. PATENT DOCUMENTS

| | | | |
|---|---|---|---|
| 5,021,906 | * 6/1991 | Chang et al. | 360/103 |
| 5,442,504 | * 8/1995 | Nagase et al. | 360/104 |
| 5,442,850 | 8/1995 | Kerth | 29/603 |
| 5,659,448 | 8/1997 | Shimizu et al. | 360/104 |
| 5,687,042 | * 11/1997 | Chhabra et al. | 360/103 |
| 5,687,597 | 11/1997 | Girard | 72/21.4 |
| 5,712,463 | 1/1998 | Singh et al. | 219/121.6 |
| 5,771,570 | 6/1998 | Chhabra et al. | 29/603.06 |
| 5,936,806 | * 8/1999 | Pan et al. | 360/104 |
| 6,108,170 | * 8/2000 | Crawforth et al. | 360/234.3 |

* cited by examiner

Primary Examiner—Robert S. Tupper
(74) Attorney, Agent, or Firm—Lumen Intellectual Property Services

(57) ABSTRACT

A method for changing the curvature of an air bearing surface (ABS) of a slider after the slider is attached to a suspension. The method includes the step of scribing a surface of the suspension to alter the stress on the suspension to change the curvature of the suspension and thus cause a change in the curvature of the slider ABS. The method includes producing scribe lines by ablation and melting/resolidification of the suspension to alter the stress on the suspension, thereby also causing a change of curvature in the ABS. Scribing is performed within a scribe region, which is defined according to a slider footprint. The curvature of a suspension can be altered by scribing before the slider is attached to it thus adjusting the curvature of the suspension to reduce any undesirable slider curvature changes caused by the attachment process. The present invention also includes suspensions processed according to the method.

7 Claims, 6 Drawing Sheets

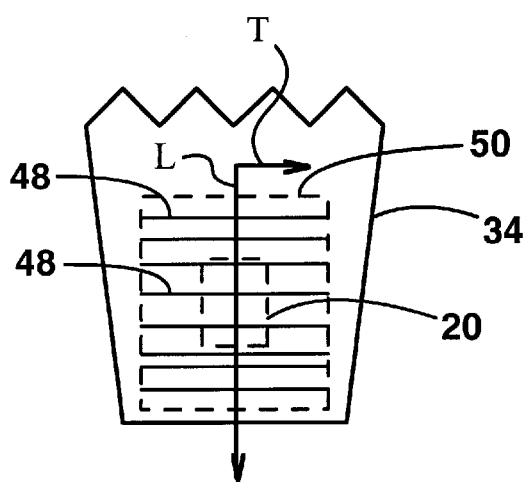
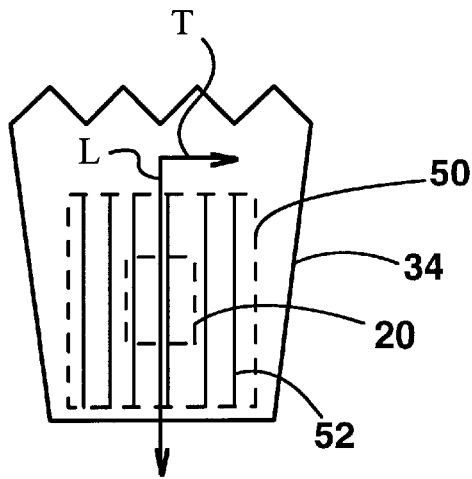
Fig. 7A          Fig. 7B
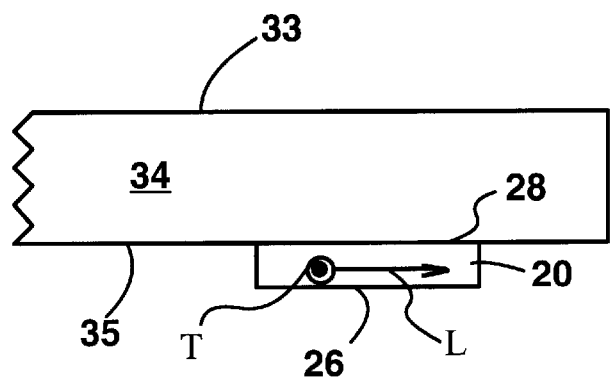
Fig. 8A
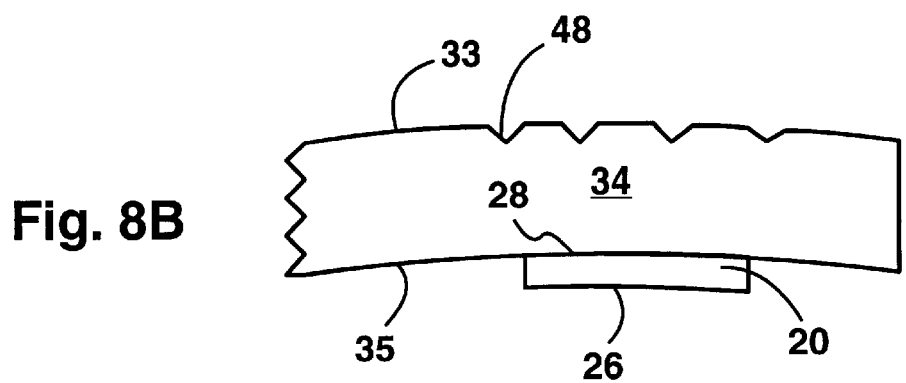
Fig. 8B

CURVATURE ADJUSTMENT OF SLIDERS BY SCRIBING OF SLIDER SUSPENSION

FIELD OF THE INVENTION

This invention relates generally to disk drive actuators having sliders attached to a suspension arm or gimbal assembly. More particularly, the present invention relates to adjusting the curvature of mounted sliders by scribing using an energetic beam, e.g., a laser beam, the suspension arm on the reverse side behind the area that the slider is attached to, or on the front side.

BACKGROUND OF THE INVENTION

Hard drives utilizing magnetic data storage disks are used extensively in the computer industry. Each magnetic data storage disk in a hard drive has an associated slider which carries a read/write head used to magnetically read and write data to and from the disk. During operation, the disks are rotating and one slider is maintained close to the surface of each disk or two sliders are close to the top and bottom surfaces of the disk respectively. The motion of the disk past the slider and the slider geometry, in particular the geometry of its surface facing the disk or the air bearing surface (ABS) regulates the flying height of the slider. Thus the distance between the disk and the read/write head are to be tightly controlled to improve data communication between the read/write head and the disk. This distance is called the flying height of the slider on the disk.

Typically, the slider is shaped to fly upon a cushion of air formed by the rapidly rotating disk surface between the air bearing surface and the disk surface. The air bearing surface has a shape which is designed to provide for a low but stable flying height between the slider and disk. The slider must not touch the disk surface because damage can result. Also, it is desirable to maintain as small a flying height as possible, because the closer the read/write head is to the disk surface the higher the areal density of data which can be stored on the disk. As flying height is reduced, it becomes increasingly difficult to maintain the flying height accuracy for a production population of sliders to the degree required for reliable recording and reading of data.

The shape of the slider has a substantial effect upon flying height. More specifically, the flying height is dependent upon the average curvature of the air bearing surface of the slider. The curvature of the air bearing surface is often affected by the manufacturing processes used to make the slider. Cutting, grinding and lapping operations in making the slider (either the air bearing surface or a surface opposite to the air bearing surface) often cause stress variations in the slider which distort the shape of the air bearing surface. After the final lapping, it is almost always necessary, especially for high storage density applications, to adjust the curvature of the air bearing surface to a desired target curvature. After the completion of the slider manufacturing process, a particular slider exhibits a combination of curvature properties. A population of sliders will exhibit a distribution of flatness parameters that can be described statistically. When the slider is bonded onto a head gimbal (HG) steel suspension, the flatness parameters are modified in an unpredictable manner. The distribution of curvature parameters associated with a population of sliders will be adversely affected by the bonding process of the HG assembly (HGA). For example, the mean of the flatness parameters will change and the standard deviations of the various flatness parameters will increase after HGA bonding. The causes include variations in the initial flatness, flexibility, surface stress and smoothness of the population of suspension arms, and variations in the epoxy uniformity and processing conditions.

The curvature of a slider is described by three parameters: crown curvature, camber curvature, and twist. Crown is the curvature along a direction parallel to the recording tracks of the data storage disks. Camber is the curvature along a direction perpendicular to the recording tracks. Twist is the curvature difference along the two diagonals of the slider as in the shape frequently present in a potato chip (two diagonal corners curved upwards, and two diagonal corners curved downwards).

U.S. Pat. No. 5,266,769 to Deshpande et al. discloses a method of adjusting the curvature of the air bearing surface of a slider by scribing a back surface (opposite the air bearing surface) of the slider. The scribing modifies the stress at the back surface, thereby controllably changing the curvature of the air bearing surface. Scribing may be performed with a laser, a sandblasting tool or the like. A curvature measuring tool may monitor the curvature of the air bearing surface as material is removed, thereby providing feedback control if desired. The method of Deshpande is effective for controllably changing the crown and camber curvature of the air bearing surface of the slider but ineffective in controlling the subsequent effects of the HGA bonding process mentioned above.

To better illustrate this shortcoming, FIG. 1 shows a portion of a head gimbal assembly 10. The assembly 10 has a slider 12 attached to a suspension arm 14. The suspension arm 14 is bonded to a mounting section 16 which attaches to a rotary actuator (not shown) inside a hard drive. The slider 12 has an air bearing surface 18 facing away from the suspension arm 14. The suspension arm 14 is made of a thin piece of flexible metal such as stainless steel. The slider 12 is attached to the suspension arm 14 with an adhesive such as epoxy.

A problem with the current state of the art is that the curvature of the air bearing surface 18 changes unpredictably when the slider 12 is attached (i.e. glued) to the suspension 14. Therefore, although slider curvature can be accurately adjusted using the method of Deshpande, a slider no longer has an accurately determined curvature after attachment to a suspension 14. This leads to imprecise flying height for the slider, resulting in an increased chance of drive failure and reduced data capacity.

U.S. Pat. No. 5,712,463 to Singh et al. discloses a method of adjusting the gram load applied to a slider and attitude of a slider attached to a suspension. The method includes the steps of scribing the suspension at certain hinge locations away from the slider so that the spring characteristics of the suspension are altered. The method disclosed by Singh is not capable of altering the curvature (e.g. crown or camber curvature) of a slider attached to the suspension. The method of Singh cannot change the shape of the slider. The method of Singh can only change the gram load applied to the slider and angular orientation (i.e. attitude) of the slider. Therefore, the method of Singh cannot solve the problems relating to slider curvature changes resulting from attachment to a suspension.

Yet another prior art approach to non-local processing of the flexure arm to which the slider is attached is described in U.S. Pat. No. 5,687,597 to Girard. Unfortunately, this method is very cumbersome and is not capable of accurately adjusting the crown, camber and twist of the slider's air bearing surface. Rather, this approach is aimed at adjusting the gram load of the suspension to solve for imprecisions in flying height and does not address changes to the slider's shape and air bearing surface after attachment to the suspension.

It would be an advance in the art of data storage drive construction to provide a method for adjusting the curvature of an air bearing surface of a slider after the slider is attached to a suspension such as an HGA. Such a method would provide increased control of slider curvature for sliders in data storage drives and lead to tighter flying height distributions and ability to store data at higher areal densities.

OBJECTS AND ADVANTAGES OF THE INVENTION

Accordingly, it is a primary object of the present invention to provide a method for adjusting the crown, camber, and twist curvature of a slider after it is attached to a suspension, such as an HGA. The method should be capable of producing accurate curvature changes, including positive and negative curvature changes.

It is another object of the invention to ensure that the method of the invention is easy to implement, rapid and inexpensive.

These and other objects and advantages will be apparent upon reading the following description and accompanying drawings.

SUMMARY OF THE INVENTION

These objects and advantages are attained by a method for changing a curvature of an air bearing surface (ABS) of a slider attached to a suspension and a slider thus modified. The method calls for defining a footprint of the slider on the suspension and attaching the slider to a first surface on the suspension by the slider's flex side surface (FSS). Then, a scribe region of certain dimensions is defined on the suspension. The scribe region overlaps at least a portion of the slider footprint. Suspension material is modified, e.g., melted/resolidified or removed in scribe lines within the scribe region to thus alter the stress on or within the suspension, thereby altering the ABS curvature.

In one embodiment the scribe region is located on a second surface of the suspension, opposite the first surface. In an alternative embodiment the scribe region is located on the first surface as well. In this embodiment the suspension material is removed or modified, e.g., by melting/resolidification before attaching the slider to the first surface by the FSS. Preferably, the scribe region is on the second surface opposite the first surface and the removal or modifying step is performed after the slider is attached to mitigate the uncontrolled curvature changes caused by the attachment process.

Of course, material can also be removed or modified before attaching the slider.

The suspension material is removed or modified in a scribe pattern made up of scribe lines. The scribe lines can be produced by a laser or any suitable energetic beam device. "Scribing" or "scribe line" is used here to indicate a regional treatment process of the surface resulting in a change in surface stress. It can also be a melting process followed by resolidification that increases the surface tensile stress. It can also be some other process that modifies surface stress, e.g., annealing. We shall describe the effects of ablation and melting/resolidification here, but it is to be understood that other processes for scribing action are possible and within the scope of the invention to the extent that they suitably modify the surface stress in the suspension.

The types of ABS curvature which can be adjusted include crown, camber, twist and rolloff, such as rolloff near a leading or trailing edge of the slider. To adjust these curvatures the scribe lines are made at a predetermined angle to a longitudinal direction of the slider. For example, crown curvature is adjusted by scribe lines running perpendicular to the longitudinal direction of the slider while camber is adjusted by scribe lines perpendicular to a transverse direction of the slider (i.e., parallel to the longitudinal direction). Twist of the ABS surface can be produced by scribe lines which are set at a certain angle to the longitudinal direction. Rolloff near the leading edge of the slider is adjusted by making scribe lines within a scribe region extending preferably from a location within the footprint to a location outside the slider footprint.

Preferably, the scribe region is centered on the slider's footprint. In a most preferred embodiment, the scribe region also has a width ranging from the width of the footprint to three times the width of the footprint and a length which ranges from the length of the footprint to three times the length of the footprint, but as limited by the size of the suspension. Suspensions made in accordance with the method of the invention can be used in multiple applications. In particular, they can be used to carry sliders with read/write heads and be employed in disk drives, e.g., magnetic media hard disk drives.

DESCRIPTION OF THE FIGURES

FIG. 7A shows a suspension end with crown ablation lines.

FIG. 7B shows a suspension end with camber ablation lines.

FIGS. 8A–8B are side views illustrating the effect of crown ablation lines.

DETAILED DESCRIPTION

The present invention provides a method for adjusting the crown, camber and twist curvature of an air bearing surface of a slider after the slider is attached to a suspension. The present invention includes methods for producing both positive and negative changes in curvature.

Figure 1:
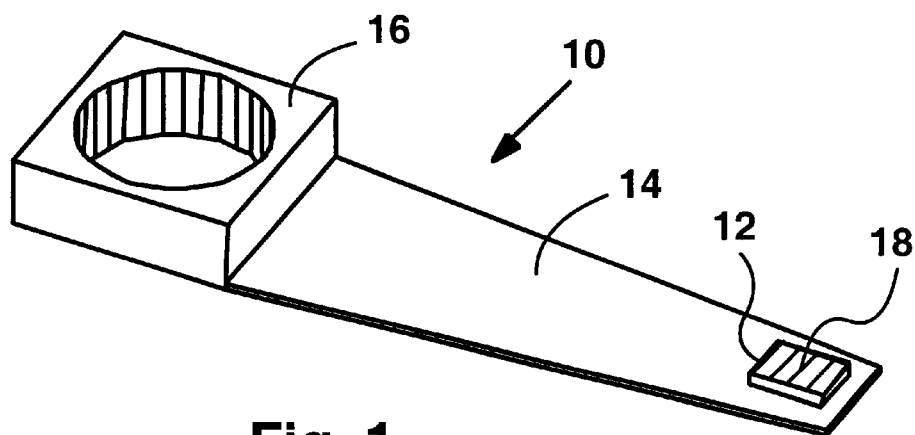
FIG. 1 (prior art) shows a slider attached to a suspension.
Figure 2A:
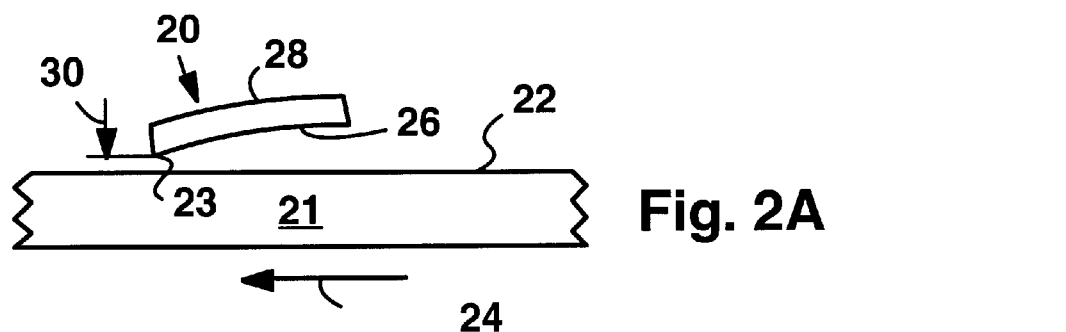
FIGS. 2A–2B show examples of negative and positive crown curvature.
Figure 2B:
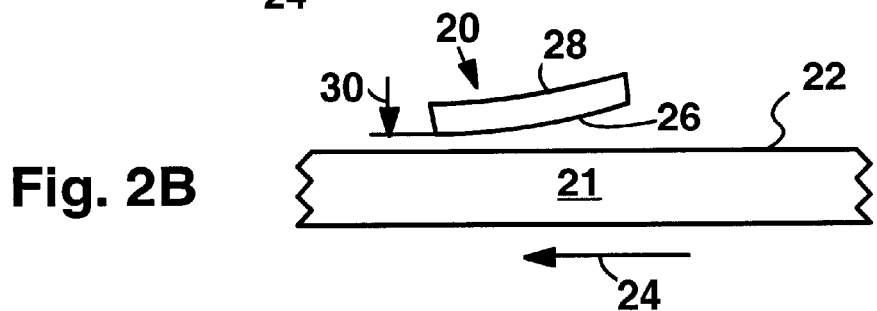

FIG. 2A shows a side view of a slider 20 over a data recording surface 22 of a recording medium 21, e.g., a magnetic recording disk. The slider 20 has a negative crown curvature. Arrow 24 indicates the travel direction of the medium 21. The slider 20 has an air bearing surface 26 (ABS) facing surface 22. As the medium 22 moves an air cushion forms and slider 20 floats on the ABS 26 at a flying height 30, defined as the distance of the magnetic read/write sensor (not shown) above the disk surface 22. Typically, the read/write sensor or head is located in or near a trailing edge 23 of slider 20 which settles at flying height 30 during operation. The slider 20 has a back surface or a flex side surface 28 (FSS) which is attached to a suspension (not shown). For comparison, FIG. 2B shows a side view of the slider 20 having a positive crown curvature.

Figure 3A:
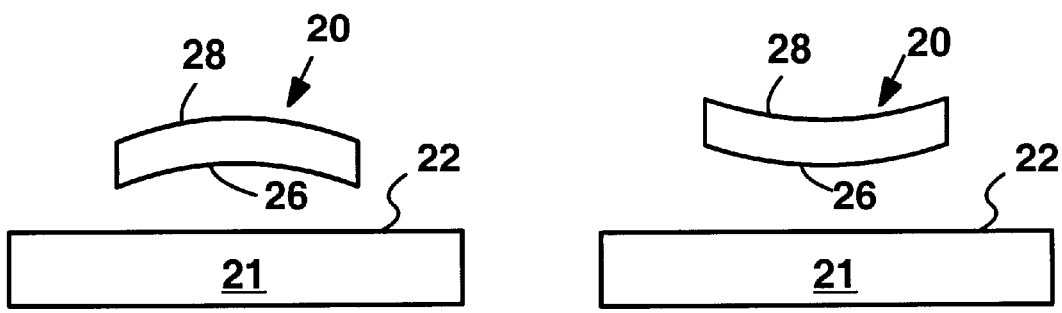
FIGS. 3A–3B show examples of negative and positive camber curvature.
Figure 3B:
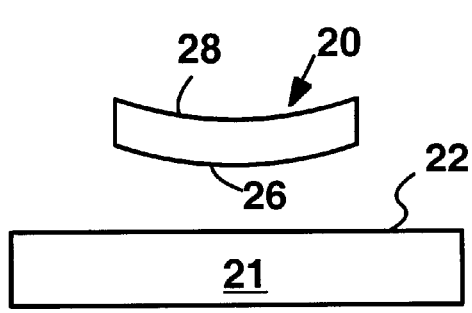

FIG. 3A shows a front view of the slider 20 having a negative camber curvature. The view of FIG. 3A is perpendicular to the view of FIGS. 2A and 2B, so the recording surface 22 is moving into the page. FIG. 3B shows a front view of the slider 20 having a positive camber curvature.

Figure 4:
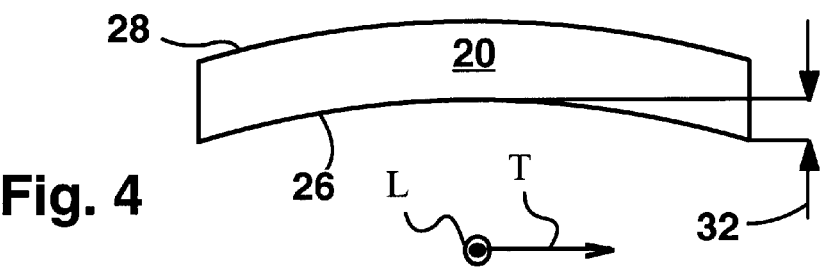
FIG. 4 illustrates how curvature is defined according to the present invention.

FIG. 4 shows how crown and camber curvature are defined in the present invention. Curvature is measured in units of distance defined by the length 32. Length 32 is the distance between the highest and lowest points on the air bearing surface 26. A negative curvature value indicates that the ABS 26 is concave; a positive curvature value indicates that the ABS 26 is convex (this is true for both crown and camber curvature). A longitudinal direction L (out of the page) and a transverse direction T of the slider 20 are indicated. For clarity, in this case crown curvature is the curvature along longitudinal direction L and camber is the curvature along the transverse direction T. Hence, FIG. 4 actually shows camber curvature of the slider 20. In either case, length 32 is a measure of the curvature of the slider 20.

Figure 5:
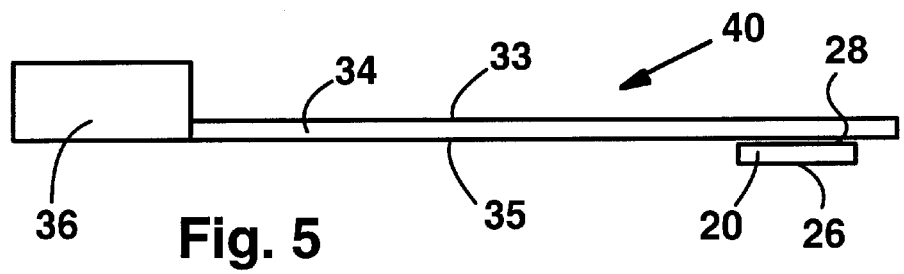
FIG. 5 shows a side view of a slider attached to a suspension.

FIG. 5 shows a side view of an arm assembly 40 having a mounting section 36 and a suspension 34 carrying the slider 20. The suspension has a top surface 33 and a bottom surface 35. The slider is attached by the FSS 28 to the bottom surface of the suspension 34. The suspension is bonded to the mounting section 36. The mounting section 36 is designed for attachment to a rotary actuator (not shown) inside a hard disk drive. The FSS 28 of slider 20 can be attached to the suspension 34 with an epoxy or a similar adhesive. Attaching the slider 20 results in unpredictable changes in the crown, camber and twist curvature of the slider 20. The curvature change can be positive or negative, depending upon the characteristics of the suspension 34, slider 20 and adhesive.

Figure 6A:
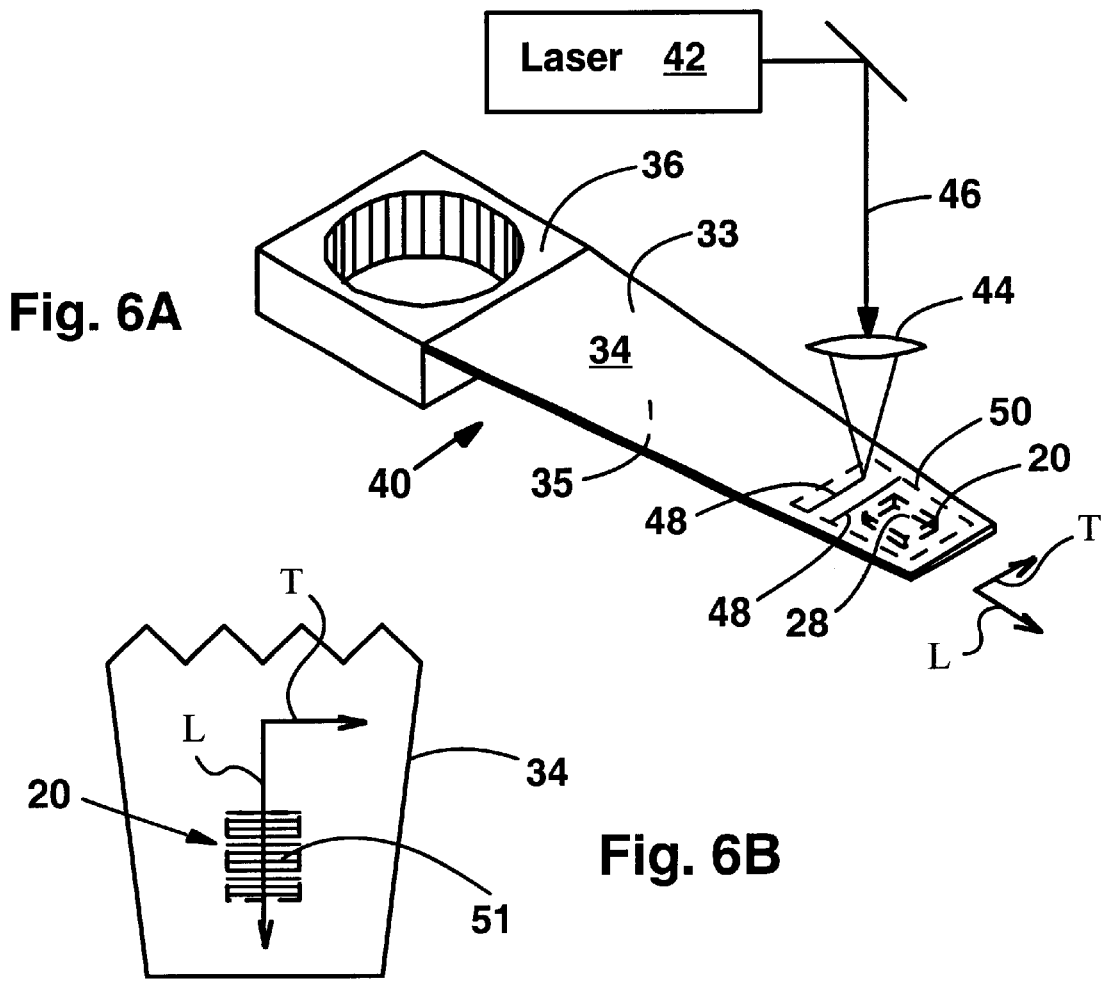
FIG. 6A shows a perspective view of the present method.

FIG. 6A shows a perspective view of the arm assembly 40 in combination with a laser 42 and lens 44 for performing the method of the present invention. The laser 42 is preferably a pulsed laser such as a Nd:YAG, Nd:YVO$_4$ or Nd:YLF laser. The laser 42 produces laser pulses having sufficient power for ablating or modifying, e.g., melting/resolidification of the material of the suspension 34. The slider 20 is located on the bottom surface 35 of the suspension 34, and is therefore drawn with dashed lines.

The laser 42 and lens 44 direct a laser beam 46 towards the top surface 33 (opposite the slider 20) of the suspension 34. Movement or scanning of the laser beam 46 across the top surface 33 produces crown scribe lines 48. The crown scribe lines 48 are confined within a scribe region 50. The crown scribe lines 48 shown in FIG. 6A are perpendicular to the longitudinal direction L of slider 20 and hence effective for changing the crown curvature of the slider 20. If scribe lines are scribed outside of scribe region 50, they have reduced effectiveness for changing the crown curvature of slider 20.

Figure 6B:
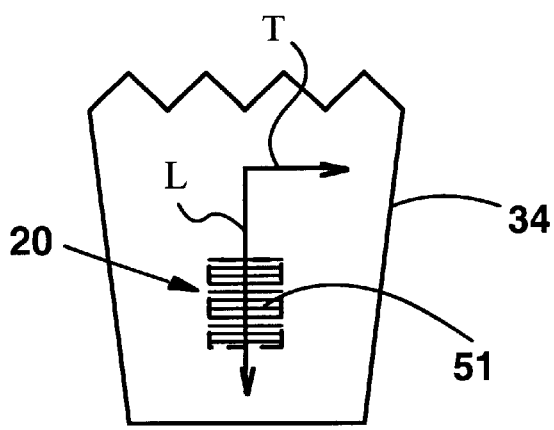
FIG. 6B shows a close-up view of a suspension end, illustrating a slider footprint.
Figure 9A:
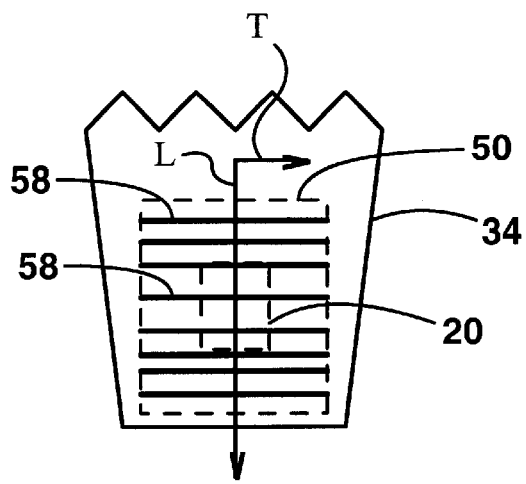
FIGS. 9A–B shows a suspension end with crown molten/resolidified lines and with camber molten/resolidified lines.
Figure 9B:
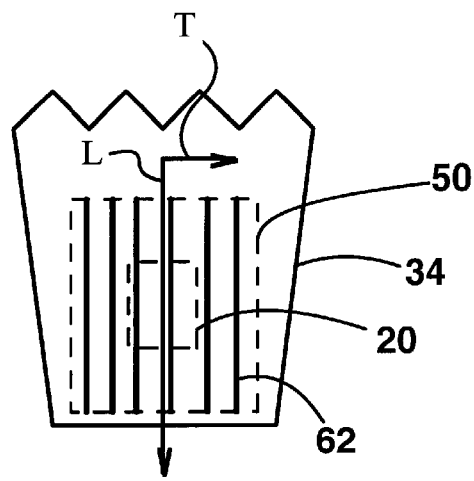

FIG. 6B shows a close-up top view of the end of the suspension 34 carrying the slider 20. The slider 20 is attached on the bottom surface 35 of the suspension 34 and is therefore shown with a dashed line. A slider footprint 51 is indicated by the hatched area. Of course, the slider footprint is the same size as the slider 20.

FIG. 7A shows a close-up top view of the top surface 33 at the end of the suspension 34. The mounting section is not shown. The crown scribe lines 48 or crown ablation lines in this case, i.e., lines produced by removal of suspension material through ablation are located on the top surface 33 and are oriented in a direction parallel to the transverse direction T of the slider 20 or perpendicular to its longitudinal direction L. This orientation of the crown ablation lines 48 results in mainly changing the crown curvature of the slider 20. Scribe region 50 is also shown.

FIG. 7B shows a close-up top view of the end of suspension 34 with camber scribe lines 52 or camber ablation lines. The camber ablation lines 52 are on the top surface 33, within scribe region 50 and they are oriented in a direction parallel to the longitudinal direction L of the slider 20 or perpendicular to its transverse direction T. This orientation of the scribe lines results mainly in a change of the camber curvature of the slider 20. It should be noted that in FIGS. 7A and 7B the scribe lines 48, 52 are produced on the top surface 33 of suspension 34, opposite the slider 20 whose FSS 28 is attached to bottom surface 35; specifically, the scribe lines 48, 52 are not located on the slider 20.

The scribe lines 48, 52 based on energetic ablation increase the compressive stress on the top surface 33. This results in a decrease in crown curvature or camber curvature, depending on the orientation of the scribe lines 48, 52. FIG. 8A shows an enlarged side view of the suspension 34 and slider 20. FIG. 8B shows an enlarged side view of the suspension and slider after crown ablation lines 48 have been scribed into the top surface 33. The ABS 26 of the slider has a more negative crown curvature (i.e. is more concave) due to the crown ablation lines 48.

Since the amount of curvature change also depends upon the residual stresses on the suspension 34, the mechanical characteristics of the suspension influence the curvature change. For example, if the suspension 34 has a large residual tensional stress in the top surface 33, then relatively few scribe lines 48, 52 are required to produce a large curvature change. If the top surface 33 has a small amount of residual tensional stress, then a large number of scribe lines are required to produce the same curvature change.

Scribe region 50 is preferably somewhat larger than the footprint 51 of the slider 20. Most preferably, scribe region 50 is three times wider and three times as long as the slider footprint, and is centered upon the slider 20. The scribe region 50 3 times longer and 3 times wider will have an area 9 times that of the slider footprint. For example, if the slider has a footprint 51 of 1.25 mm×1.0 mm, then the scribe region 50 most preferably has a size of 3.75 mm×3.0 mm, as limited by the size of typical suspensions, centered upon the slider 20. The scribe region 50 can also have different dimensions, e.g., it can be twice as wide and twice as long as the slider 20 or it can be the same size as the slider 20 footprint 51. Scribe lines 48, 52 scribed directly opposite the slider 20, i.e., within slider footprint 51 have the greatest effect upon the slider curvature. Scribe lines 48, 52 located outside footprint area, but still within the scribe region 50, have a reduced, but still significant effect upon slider curvature. The effectiveness of a scribe line 48, 52 for changing curvature decreases with distance from the slider footprint.

The scribe lines 48, 52 shown in FIGS. 7A and 7B are scribe lines formed by ablating or otherwise removing material from the top surface 33 of the suspension 34. The scribe lines 48, 52 are preferably made using a pulsed, frequency doubled Nd:YAG laser with fundamental or harmonic output wavelengths. Of course, a person of average skill in the art will recognize that any suitable laser source capable of producing the requisite scribe lines 48, 52 can be used. In the event of using a pulsed laser the laser pulses must have a power density (power/area) which exceeds a material modification threshold for the material of which suspension 34 is made.

Preferably, the scribe lines 48, 52 are continuous, and not dashed. Continuous scribe lines can be made with a pulsed laser by scanning the laser beam at a slow enough speed such that successive laser pulses overlap. The scribe lines 48, 52 can be made to different depths. In fact, the width and depth of scribe lines, as well as their spacing, number and location can be adjusted to achieve the desired curvature correction.

The present invention also includes a method for increasing tensional stress in the top surface 33. Increasing tensional stress in the top surface 33 increases the curvature of the ABS 26 (i.e. makes the ABS more convex). According to the method of the present invention, the tension in the top surface 33 is increased by laser melting followed by resolidification. Laser melting at locations on the top surface is performed with a laser beam that does not have sufficient power density for causing ablation. Material is not removed from the top surface 33 and instead the top surface 33 is locally melted. Upon refreezing or resolidification, the top surface has an increased tensional stress. Laser melting is caused when the laser 42 has a proper power density below the ablation threshold.

In a manner analogous to FIGS. 7A–B, FIGS. 9A–B show a close-up view of the top surface 33 of the suspension 34 with crown scribe lines 58 or crown molten/refrozen lines. Crown molten/resolidified lines 58 are within the scribe region 50 on the top surface 33 and are oriented perpendicular to longitudinal direction L of slider 20. Camber scribe lines or camber molten/resolidified lines 62 are within the scribe region 50 but are oriented perpendicular to the transverse direction T of slider 20.

A combination of scribe lines, including ablated, molten/resolidified or both, or other scribe lines which modify the stress in the suspension, and are oriented at certain angles to the longitudinal direction and to the transverse direction of the slider 20 or twist scribe lines can also be used to mitigate twist of the ABS 26. A person of average skill in the art will be able to determine the appropriate angle in any particular case, preferably in a feedback process. This can be accomplished by using a curvature and twist measurement system to monitor the changes in curvature and twist of the ABS 26.

Figure 10A:
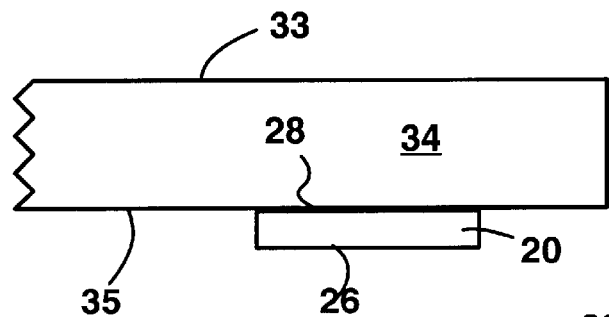
FIGS. 10A–B are side views illustrating the effect of crown molten/resolidified lines.
Figure 10B:
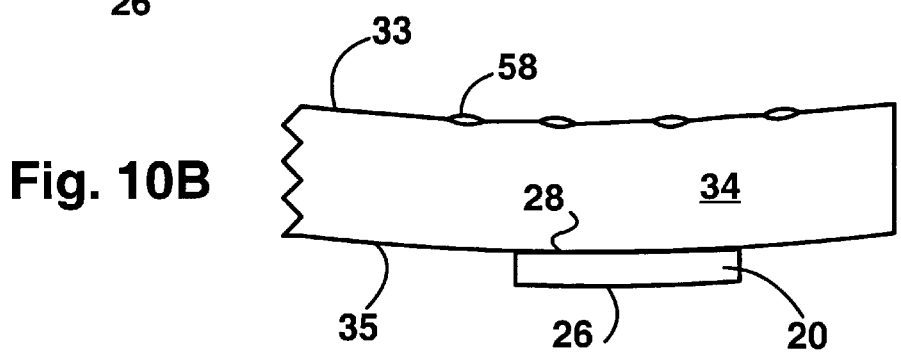

FIGS. 10A and 10B show enlarged side views of the suspension 34 before and after crown molten/resolidified lines 58 are created. The crown molten/resolidified lines 58 increase the tensile stress in the top surface 33, thereby causing the suspension to bend upwards, increasing the crown curvature of the ABS 26 (i.e. making the ABS 26 more convex).

Most generally, scribing crown or camber scribe lines produced with a high laser power density (above ablation threshold) can cause increased compressive stress in the top surface, leading to a more concave slider ABS 26. Molten/resolidified crown or camber anneal lines produced with a relatively low power density (below ablation threshold) cause an increase in the tensile stress in the top surface, leading to a more convex slider ABS 26.

Figure 11:
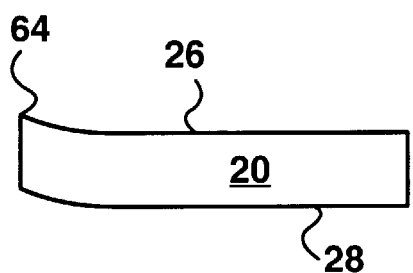
FIG. 11 is a side view of a slider illustrating leading edge rolloff curvature.

FIG. 11 shows a side view of a slider with a large positive crown rolloff. The present invention also includes a method for adjusting crown rolloff of a slider. Crown rolloff describes the amount of crown curvature in the vicinity of a leading edge 64 (or leading edge) of the slider. For some slider applications, it is desirable to have a positive crown rolloff.

Figure 12:
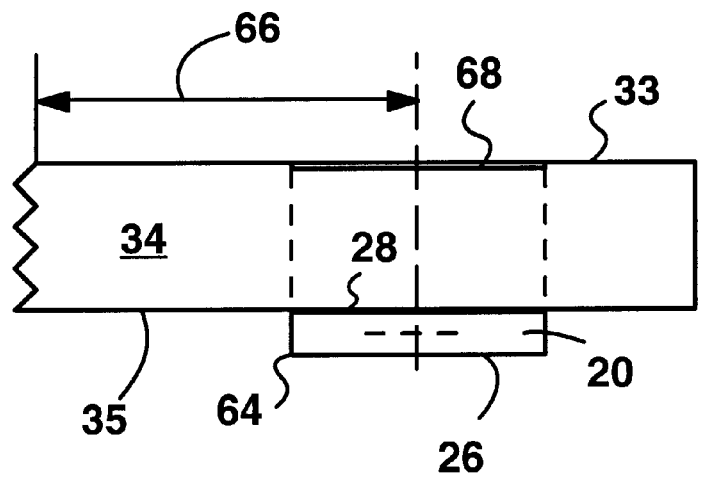
FIG. 12 is a side view showing where scribe lines can be formed to effect rolloff curvature.

FIG. 12 illustrates how a crown rolloff is preferentially changed according to the present invention. FIG. 12 is a close-up side view of slider 20 and suspension 34. To change crown rolloff, crown ablation lines 48 or crown molten/resolidified lines 58 are only produced within region 66. Region 66 extends from a middle of footprint 68, to typically one slider length in front of leading edge 64.

As noted above, the slider 20 changes curvature unpredictably when attached to the suspension 34. The amount of curvature change experienced by a slider after attachment depends in part upon the curvature of the suspension before attachment. If the suspension curvature is excessively different from that of the slider in a region where the slider is attached, then the slider will experience substantial curvature change after attachment. Therefore, adjusting the curvature of the suspension before slider attachment (i.e. reducing curvature of the suspension) provides a method for reducing the amount of curvature change experienced by the slider after attachment.

Figure 13:
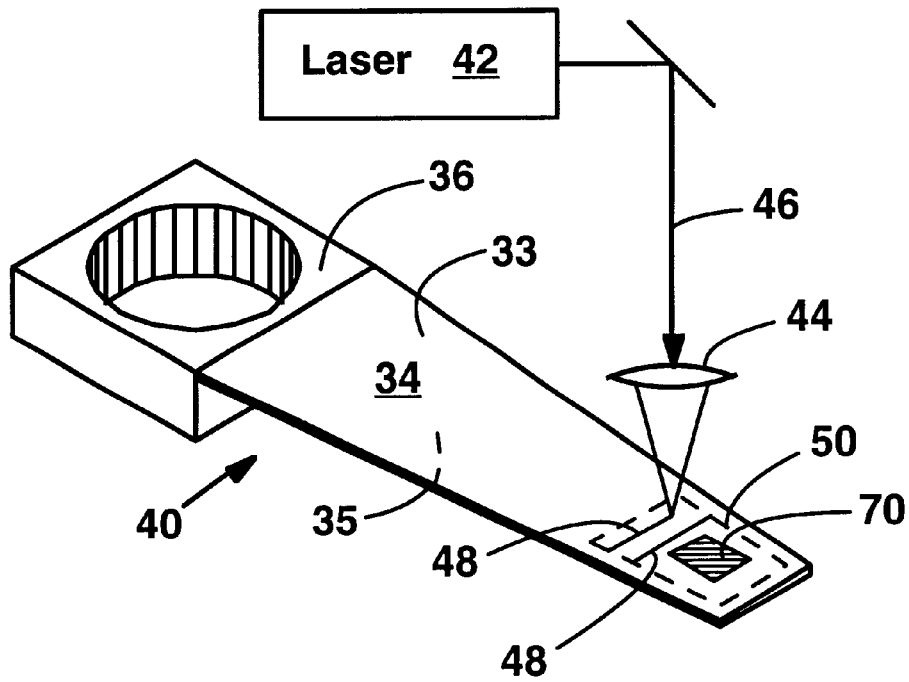
FIG. 13 shows a method of the present invention in which the suspension curvature is changed without the slider attached to the suspension.

Accordingly, the present invention includes a method for changing the curvature of the suspension before a slider is attached. FIG. 13 illustrates the method of the invention for changing curvature of the suspension 34. The suspension 34 without the slider 20 attached has an intended footprint 70, where the slider 20 is to be attached. The scribe region 50 is defined around the intended footprint 70. The intended footprint can be 3 times as wide, and 3 times as long as the intended footprint, for example. To change a crown curvature of the suspension 34, crown scribe lines 48 are formed on the top surface 33 of the suspension 34. Additionally, scribe lines can be formed on the bottom surface 35 (within scribe region 50). This is possible because a slider is not attached to the bottom surface 35. In this manner suspension 34 can be prepared before attachment of slider 20. After attachment, if it is determined that the crown, camber, twist or rolloff of the slider 20 are not correct, additional scribe lines can be produced in on the top surface 33 of the suspension 34.

Figure 14:
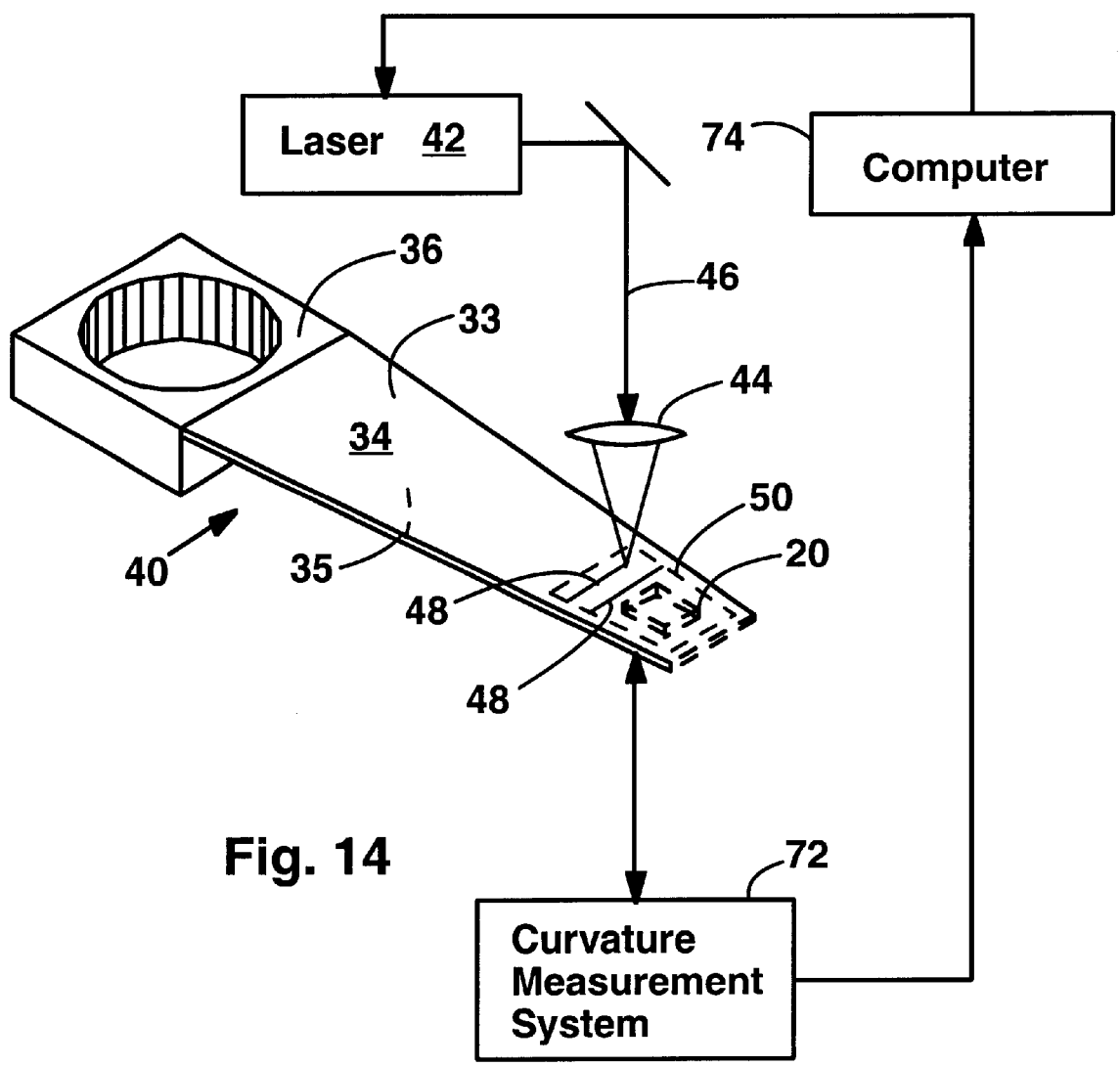
FIG. 14 shows a system for curvature adjustment which uses a curvature measurement system and curvature feedback control.

FIG. 14 shows a preferred implementation of the method of the present invention. An optical curvature measurement system 72 is used to monitor the curvature of the ABS 26 (or, alternatively, bottom 35 or top surface 33) while scribe lines are produced. The curvature measurement system can monitor the curvature of the surface opposite that which is being affected by scribing. The optical curvature measurement system can be a WYKO or ZYGO interferometric curvature measurement system as known in the art. Of course, a person skilled in the art will realize that any suitable flatness/curvature measurement system can be used. The curvature measurement system can be interfaced with a computer 74 to provide feedback control of the scribing laser 42.

It is understood that crown scribe lines, camber scribe lines and twist scribe lines are all examples of scribe patterns. Also many different scribe patterns can be formed for different desired curvature changes.

It will be clear to one skilled in the art that the above embodiment may be altered in many ways without departing from the scope of the invention. Accordingly, the scope of the invention should be determined by the following claims and their legal equivalents.

What is claimed is:

1. A suspension for use in a disk drive, said suspension having a first surface thereon for attaching a slider having a flex side surface and an air bearing surface, said slider being attached by said flex side surface and said air bearing surface having a curvature, said suspension comprising:
   a) a footprint on said suspension, said footprint corresponding to said slider;
   b) a scribe region having predetermined dimensions and overlapping at least a portion of said footprint;
   c) scribe lines in suspension material, said scribe lines altering a surface stress within said suspension, thereby altering said curvature of said air bearing surface.

2. The suspension of claim 1, wherein said scribe region is located on a second surface of said suspension opposite said first surface.

3. The suspension of claim 1, wherein said scribe region is located on said first surface.

4. The suspension of claim 1, wherein said scribe lines are selected from the group consisting of ablated scribe lines and melted/resolidified scribe lines.

5. The suspension of claim 4, wherein said scribe lines are at a predetermined angle to a longitudinal direction of said slider.

6. The suspension of claim 1, wherein said scribe region is centered on said footprint.

7. The suspension of claim 6, wherein a width of said scribe region ranges from the width of said footprint to approximately three times the width of said footprint and a length of said scribe region ranges from the length of said footprint to approximately three times the length of said footprint.

* * * * *